United States Patent [19]

Ishii et al.

[11] Patent Number: 5,118,962
[45] Date of Patent: Jun. 2, 1992

[54] POWER SUPPLY BACKUP CIRCUIT

[75] Inventors: Takaaki Ishii, Sagamihara; Masayuki Sakanishi, Hino, both of Japan

[73] Assignee: Kabushiki Kaisha Toshiba, Kawasaki, Japan

[21] Appl. No.: 493,717

[22] Filed: Mar. 15, 1990

[30] Foreign Application Priority Data

Mar. 16, 1989 [JP] Japan .................. 1-64854

[51] Int. Cl.⁵ .............................................. H02J 9/06
[52] U.S. Cl. .................................. 307/64; 307/72; 307/85
[58] Field of Search .............. 307/43, 64, 85, 86, 307/87, 72

[56] References Cited

U.S. PATENT DOCUMENTS

| 3,784,841 | 1/1974 | Hosaka | 307/64 |
| 4,227,257 | 10/1980 | Satoh | 307/64 |
| 4,795,914 | 1/1989 | Higa et al. | 307/64 |

Primary Examiner—A. D. Pellinen
Assistant Examiner—Jeffrey A. Gaffin
Attorney, Agent, or Firm—Finnegan, Henderson, Farabow, Garrett, and Dunner

[57] ABSTRACT

Improvements to a power supply backup circuit used to backup the operation of a radio device or the like when a power supply therefor is interrupted. A reverse current preventing diode is connected such that its anode is connected to the junction point of a DC power source and a voltage stabilizing circuit and such that its cathode is connected to the stabilizing circuit. A transistor is provided which has a collector connected to the cathode of the diode, an emitter connected to one end of a capacitor, the other end of which is grounded, and a base connected to a DC power source via a first resistor, and which has a second resistor connected across the base and emitter thereof. A third resistor is further connected across the collector and emitter of the transistor.

5 Claims, 1 Drawing Sheet

POWER SUPPLY BACKUP CIRCUIT

BACKGROUND OF THE INVENTION

1. Field of the Invention

The present invention relates to improvements to power supply backup circuits used for backing up the operation of a circuit, for example, of a radio device when a power supply is interrupted.

2. Description of the Related Art

FIG. 1 is a circuit diagram of a conventional power supply backup circuit. As shown, the circuit includes a reverse current preventing diode 4 inserted between a DC source 1 and a voltage regulator or stabilizer 2 and a capacitor 3 having a capacity large enough to backup a load 5 on the regulator 2, the capacitor having one end connected to a line to which the diode 4 and the regulator 2 are connected and the other end grounded. A load 6 is a circuit, that does not require backup when the power supply is interrupted temporarily.

In operation, when the power supply is stopped, for example, by an instantaneous interruption of the DC source 1, electric charges stored in the capacitor 3 discharge to backup the operation of the load 5 for a predetermined time. At this time, the current of electric charges to the load 6 is prevented by the diode 4.

The capacitor 3 is, a small-type large-capacity tantalum electrolytic capacitor which has excellent leakage current, frequency and temperature characteristics and which has recently been used in response to a demand for miniaturized high-density integrated electronic devices.

However, the tantalum electrolytic capacitor is likely to deteriorate due to rapid charging and discharging, when it is subjected to an excessive voltage or a reverse voltage. It also tends to be destroyed by shorting. Since there is a set load during discharging, discharging creates no problem. The breakage of the capacitor is due mainly to excessive current flowing therethrough during charging.

One possible solution to this problem, is to provide a resistor between the capacitor 3 and the junction point between the diode 4 and regulator 2 to limit the current charging the capacitor 3. However this causes a new problem because during discharging, a voltage available from the load 5 is reduced due to a voltage drop across the resistor in such an arrangement.

As described above, the capacitor 3 is charged and discharged using the single current path 11 in the conventional power supply backup circuit, so that a voltage available from the load 5 is reduced by inserting a resistor in the current path 11 to limit the current charging the capacitor 3.

Thus, use of a tantalum electrolytic capacitor suitable for high-density integration as the capacitor 3 does not provide enough voltage to the load.

SUMMARY OF THE INVENTION

It is an object of the present invention to provide a power supply backup circuit which is capable of supplying enough voltage to a load even if a tantalum electrolytic capacitor suitable for high-density integration is used.

In order to achieve the above object, the present invention provides a power supply backup circuit comprising at least a reverse current preventive diode having an anode connected to a DC power source and a cathode connected to a voltage stabilizing circuit; a series connected circuit of a switching element and a capacitor provided across ground and the cathode of the diode; and current path means, including a current limiting element, for leading a current from the DC source to the junction point of the switching element and the capacitor; whereby the switching element is turned off in accordance with the potential of the electric path means when the capacitor is charged with the current from the capacitor, and turned on in accordance with a potential due to a discharging current from the capacitor to the current path means when the current from the DC source is interrupted, such that the discharging current from the capacitor is fed to the voltage stabilizing circuit via the switching element turned on.

By such arrangement, the charging current flowing through the current path is limited by the current limiter while the discharging current flowing through the switching element is not limited. Therefore, it is possible to provide enough voltage to the load even if a tantalum electrolytic capacitor suitable for high density integration is used.

Therefore, according to the power supply backup circuit according to the present invention, a deterioration in the performance of the capacitor which would otherwise arise due to rapid charging and discharging is prevented, so that enough voltage is supplied to the load if a tantalum electrolytic capacitor suitable for high density integration is used.

DESCRIPTION OF THE PREFERRED EMBODIMENTS

Figure 1:
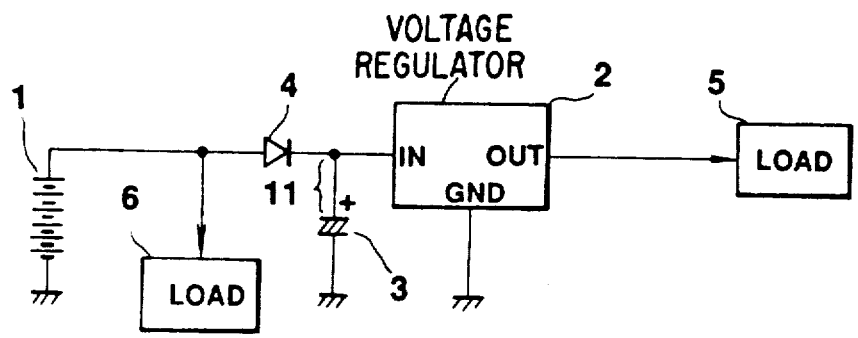
FIG. 1 is a circuit diagram of a conventional power supply backup circuit.
Figure 2:
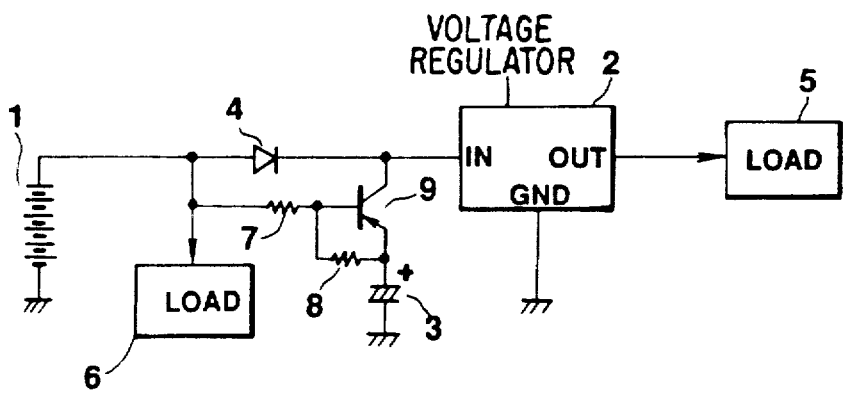
FIG. 2 is a circuit diagram of one embodiment of a power supply backup circuit according to the present invention.

FIG. 2 is a circuit diagram of one embodiment of a power supply backup circuit according to the present invention. In FIGS. 1 and 2, the same reference numerals are used to denote like elements.

FIG. 2 shows a PNP transistor 9, the collector of which is connected to the junction point of a reverse current preventing diode 4 and a voltage regulator 2, and the emitter of which is connected to a non-grounded terminal of a capacitor 3. The base of the transistor 9 is connected via a resistor 7 to the anode of the diode 4 and via a resistor 8 to the non-grounded terminal of the capacitor 3.

Therefore, the PNP transistor 9 is positioned between the non-grounded terminal of the capacitor 3 and the junction point of the diode 4 and regulator 2 and functions as a first current path without a current limiter thus allowing a discharge current to blow from the capacity 3.

The resistors 7 and 8 are positioned between the anode of the diode 4 and the non-grounded terminal of the capacitor 3 to function as second current path including a current limiter.

In operation, if the DC power source 1 is normal, the load 6 is fed directly from the power source 1 while the load 5 is fed via the diode 4 and voltage regulator 2. At this time, the transistor 9 is turned off, so that the charging current to the capacitor 3 is limited by the second current path constituted by the resistors 7 and 8.

If the power source 1 is interrupted, the transistor 9 is turned on, so that the electric charges stored in the capacitor 3 are fed via the first current path including the transistor 9 to the load 5 without being limited.

Since the current flowing to the load 6 is limited by the resistors 7 and 8, which form the second current path, no useless current is fed to the load 6.

In the described embodiment, the charging current flowing through the capacitor 3 is limited by the resistors 7 and 8, which form the second path, so that the capacitor 3 will not be harmed, due to the rapid charging even if the capacitor 3 includes a tantalum electrolytic capacitor suitable for high density integration.

If the DC power source 1 is interrupted and the capacitor 3 discharges, the transistor 9 forming the first current path is switched to a complete conductive state and the voltage across the capacitor 3 is applied to the input of the voltage regulator 2. As a result, sufficient voltage is supplied to the load 5.

When the transistor 9 is on, the load 5 is connected to the capacitor 3 to thereby prevent rapid discharging.

Figure 3:
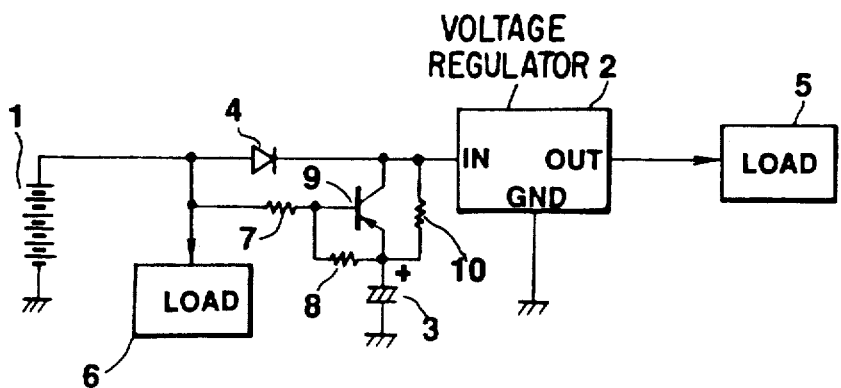
FIG. 3 is a circuit diagram of another embodiment of a power supply backup circuit according to the present invention.

FIG. 3 is a circuit diagram of another embodiment of the power supply backup circuit according to the present invention. In FIGS. 2 and 3, like elements are given the same reference numerals and further description thereof will be omitted.

The feature of the second described embodiment is characterized by a second electric current path including a resistor 10 additionally provided between the non-grounded terminal of the capacitor 3 and the junction point of the diode 4 and regulator 2.

In the described embodiment, capacitor 3 is charged at an increased rate, but useless discharge from the capacitor 3 to the load 6 is limited.

As described above, according to the embodiments of FIGS. 2 and 3, no useless voltage drop will occur during discharging while the charging current to the capacitor 3 is limited. Thus, if the capacitor 3 includes a tantalum electrolytic capacitor suitable for high density integration, its deterioration and breakage are prevented and sufficient voltage is supplied to the load.

While in the above embodiments the resistors 7, 8 and 10 and the transistor 9 are used to form the first and second current paths, respectively, the transistor is not necessarily required.

What is claimed is:

1. A power supply backup circuit comprising:
   a capacitor having a capacity large enough to backup a load;
   a charging circuit for charging the capacitor via current limiting circuitry;
   a discharging circuit for supplying the stored charge in the capacitor via a switch to a junction point of reverse current preventing circuitry and a voltage stabilizing circuit;
   means for detecting interruption of a current from a DC power source;
   control means for turning on the switch in response to a detection output from the detecting means indicative of the detection of interruption of the current from the DC power source;
   wherein the switch includes a transistor having a base, a collector connected to the junction point of the reverse current preventing circuitry and the voltage stabilizing circuit, and an emitter connected to the capacitor;
   wherein the control means includes a circuit in which the DC power source is connected to the base of the transistor via a first resistor and in which a junction point of the emitter and the base of the transistor connected via a second resistor; and
   wherein the charging circuit includes a circuit for charging the capacitor via the first and second resistors.

2. A power supply backup circuit comprising:
   a first load connected directly to a DC power source and requiring no backup;
   a second load requiring a backup connected via reverse current preventing circuitry and voltage stabilizing circuitry to the DC power source;
   a capacitor having a capacity large enough to backup the second load;
   a switch connected between the capacitor and a junction point between the reverse current preventing circuitry and the voltage stabilizing circuitry;
   a charging circuit for charging the capacitor via current limiting circuitry; and
   control means for turning on the switch when an electric current from the DC power source is interrupted.

3. A power supply backup circuit according to claim 2 wherein the charging circuit includes:
   a first charging circuit for directly charging the capacitor with an output of the DC power source; and
   a second charging circuit for charging the capacitor with the output of the DC power source via the reverse current preventing circuitry.

4. A power supply backup circuit according to claim 2 wherein the reverse current preventing circuitry includes a diode having an anode connected to the DC power source and a cathode connected to the voltage stabilizing circuitry.

5. A power supply backup circuit according to claim 2, wherein the switch includes a transistor having a base, a collector connected to a junction point of the reverse current preventing circuitry and the voltage stabilizing circuitry, and an emitter connected to the capacitor;
   the control means includes a circuit in which the DC power source is connected to the base of the transistor via a first resistor and in which a junction point of the emitter and the base of the transistor connected via a second resistor; and
   the charging circuit includes a circuit for charging the capacitor via the first and second resistors.

* * * * *